Aug. 28, 1962 K. F. ROSS 3,051,902

ANGLE-MODULATION SYSTEM

Filed Feb. 17, 1958 3 Sheets-Sheet 1

INVENTOR:

Karl F. Ross

ANGLE-MODULATION SYSTEM

Filed Feb. 17, 1958 3 Sheets-Sheet 2

INVENTOR:

Karl F. Ross

Aug. 28, 1962 K. F. ROSS 3,051,902

ANGLE-MODULATION SYSTEM

Filed Feb. 17, 1958 3 Sheets-Sheet 3

INVENTOR:

Karl F. Ross

United States Patent Office 3,051,902

Patented Aug. 28, 1962

3,051,902
ANGLE-MODULATION SYSTEM

Karl F. Ross, 5121 Post Road, Riverdale, N.Y.

Filed Feb. 17, 1958, Ser. No. 715,705
13 Claims. (Cl. 325—40)

My present invention relates to a system for the transmission of intelligence by frequency or phase modulation, sometimes referred to as angle modulation, and has for its principal object the provision of means for effecting such modulation with a saving of bandwidth yet without loss of fidelity.

It is known that the transmission of intelligence by means of an amplitude-modulated carrier wave requires a bandwidth of $n$ cycles per second where $n$ represents the number of message elements per second to be transmitted. A much larger bandwidth has heretofore been necessary to transmit the same number of message elements by means of frequency modulation or true phase modulation, as distinct from the pseudo phase modulation which occurs when the side bands of an amplitude-modulated carrier are shifted by 90° and which necessarily involves some measure of distortion. Since, however, angle modulation is much less susceptible to atmospheric and other interference than is amplitude modulation, the former is generally preferred for high-fidelity transmission in spite of the considerably larger frequency spectrum ordinarily required.

In my U.S. Patents Nos. 2,752,421 and 2,752,484, issued June 26, 1956, I have disclosed and claimed methods and means for the faithful reproduction, by an amplitude-modulated carrier wave of minimum bandwidth, of a message sampled at a given period $1/n$ (termed a Nyquist interval). The present invention involves the utilization of some of the principles of this method for the generation of angle-modulated carrier waves.

Consider a carrier wave of constant frequency F which is amplitude-modulated by a rectangular pulse so that its rise to maximum amplitude and its subsequent return to zero is substantially instantaneous. If such a wave is passed through a band-pass filter of bandwidth $F \pm f'$, the filter suppresses all the higher sideband harmonics and leaves only the fundamental frequency $f'$ so that, if the width of the pulse is equal to or greater than $1/f'$, its leading and trailing edges will be defined by cosine curves of period $1/f'$ and will each extend over an interval equal to $\frac{1}{2}f'$. In accordance with the present invention, I propose to generate, in an angle-modulation system, a succession of such wave pulses recurring at a cadence $f$ which is slightly less than the fundamental sideband frequency $f'$, the carrier wave being subjected to a change in phase and/or frequency at an instant when its amplitude is reduced to zero so that no transient sideband frequencies will be introduced by this modulation. If frequency modulation is used, the total bandwidth will of course be increased by the frequency excursion $f_x$ which, however, may be a fraction of the fundamental modulating frequency $f'$. A more specific feature of my invention resides in the provision of a filter having means for shifting its pass band in accordance with the frequency swing $f_x$.

Through the use of two trains of carrier-wave pulses as described above, relatively staggered by an interval equal to $\frac{1}{2}f$ whereby one carrier will reach maximum amplitude while the other carrier goes to zero, it is possible to double the rate of message-element transmission without any increase in bandwidth; in such system the period $\frac{1}{2}f$ will equal one Nyquist interval $1/n$. The two interleaved carriers may, on the other hand, also be used for the transmission of separate messages.

The above and other objects, features and advantages of my invention will become more fully apparent from the following detailed description of certain embodiments, reference being had to the accompanying drawing in which.

Figure 1:
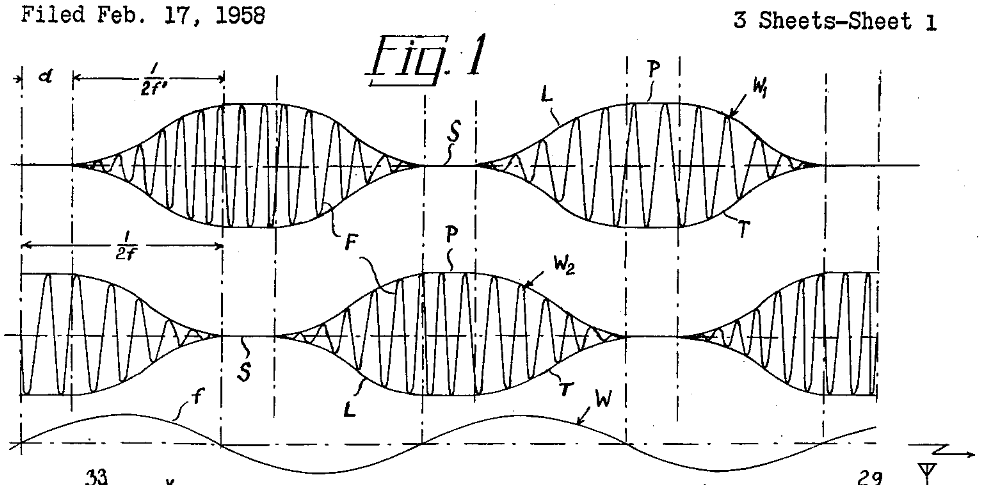
FIG. 1 is a set of graphs used in explaining the principles of my invention.

In FIG. 1 I have shown a first carrier wave $W_1$ and a second carrier wave $W_2$ as well as a reference wave W. Reference wave W has a frequency $f$ and establishes a succession of Nyquist intervals of duration $\frac{1}{2}f$ during which respective elements of a message (e.g. a television signal) are to be transmitted. The waves $W_1$ and $W_2$ are amplitude-modulated, in a manner to be described, to form trains of pulses each with a sinusoidal leading edge L, a plateau P and a sinusoidal trailing edge T; successive pulses of a train are separated by a space S whose length, equaling that of plateau P, represents an interval $d = \frac{1}{2}f - \frac{1}{2}f'$. The two pulse trains are staggered by an interval equal to $\frac{1}{2}f$ so that the plateaus P of one train coincide with the inter-pulse spaces S of the other train and vice versa, the leading edges L of each train registering with the trailing edges T of the other over an interval equal to $\frac{1}{2}f'$.

The frequency F of each carrier wave is maintained constant for the duration of each pulse L—P—T and is shifted, in accordance with the signal to be transmitted, during the interval S. It will thus be seen that at the end of each Nyquist interval, denoted by the fact that the reference wave W goes through zero, there exists a condition when, for a short time $d$, only one of the two carrier waves is in existence and has reached its plateau amplitude; thus, the frequency of the composite wave at such instant represents the instantaneous value of the transmitted signal.

Figure 2:
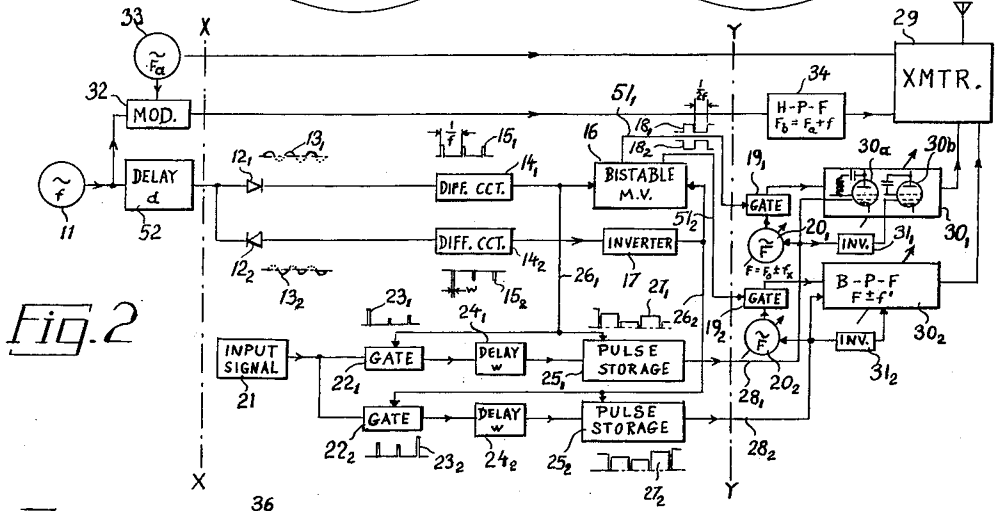
FIG. 2 is a circuit arrangement of a transmitting station embodying the invention.

FIG. 2 shows a transmitter circuit adapted to produce the waves shown in FIG. 1. It comprises an oscillator 11 of relatively low frequency $f$ working into two oppositely poled half-wave rectifiers $12_1$, $12_2$ to produce the pulsating, relatively staggered output voltages $13_1$ and $13_2$. These pulsating voltages are converted, in respective differentiation circuits $14_1$ and $14_2$, into interleaved pulse trains $15_1$, $15_2$ with a pulse spacing $1/f$ and a pulse width $w$. The pulses $15_1$ are applied to one input terminal of a bistable multivibrator 16 while the pulses $15_2$, which are of the opposite polarity, are applied to another input terminal of the multivibrator by way of an inverter 17. The multivibrator 16, triggered alternately into two different conditions of conductivity, thus produces two relatively staggered trains of gating pulses $18_1$ and $18_2$, of a width equaling a Nyquist interval $\frac{1}{2}f$, which serve for the alternate unblocking of two gate circuits $19_1$ and $19_2$ to which they are fed via respective leads $51_1$, $51_2$. These gate circuits are connected astride the outputs of two adjustable oscillators $20_1$ and $20_2$, respectively, which produce two separate waves with the relatively high carrier frequency F variable about a mean value $F_0$.

An input signal from a source 21 is transmitted in parallel through two gate circuits $22_1$, $22_2$ which are periodically unblocked for brief periods by the interleaved pulses $15_1$ and $15_2$, respectively. Thus, the outputs of these gate circuits consist of two staggered pulse trains $23_1$, $23_2$ whose amplitudes vary with the instantaneous amplitude of the signal wave from source 21. The signal-wave samples thus obtained are fed, after a delay $w$ in circuits $24_1$ and $24_2$, to respective storage circuits $25_1$, $25_2$ which are periodically discharged by the timing pulses $15_1$ and $15_2$ arriving over respective leads $26_1$, $26_2$ just prior to the arrival of the delayed message pulses $23_1$, $23_2$. The two storage devices $25_1$, $25_2$ thus produce staggered trains of rectangular signal pulses $27_1$ and $27_2$, each of a width substantially double the aforesaid Nyquist interval, which are respectively applied over leads $28_1$, $28_2$ to the oscillators $20_1$, $20_2$ to control the output frequency F thereof.

Through the gates $19_1$ and $19_2$ the oscillators $20_1$ and $20_2$ deliver alternate bursts of carrier frequency F to a transmitter 29 by way of respective band-pass filters $30_1$ and $30_2$. These filters have variable impedances, illustrated for filter $30_1$ as reactance tubes $30a$ and $30b$, which are controlled from storage circuits $25_1$, $25_2$ over the leads $28_1$, $28_2$ and inverters $31_1$, $31_2$ so that their pass band is shifted as the operating frequency F of the associated oscillator is varied from its mean $F_0$ by the difference frequency $\pm f_x$. Thus, the inductive reactance tube $30a$ may have one of its grids connected directly to lead $28_1$ to raise the upper cutoff frequency of the filter with increasing amplitudes of the pulses $27_1$ whereas the capacitive reactance tube $30b$ may have one of its grids connected to the same lead via inverter $31_1$ to raise the lower cutoff frequency under the same condition, it being assumed that a larger output from circuits $25_1$ and $25_2$ increases the operating frequencies of oscillators $20_1$ and $20_2$, respectively. The circuits $30_1$ and $30_2$ will, therefore, only pass the band $F \pm f'$ and will eliminate all the higher harmonics of frequency $f'$ in the sidebands of the modulated carrier. The result will be two waves $W_1$, $W_2$ as illustrated in FIG. 1.

For the transmission of the reference wave W to a receiving station I prefer to use a pair of oscillations of constant frequencies $F_a$ and $F_b = F_a + f$, both located beyond (e.g. above) the frequency spectrum passed by the filters $30_1$ and $30_2$. In order to make the wave W available at the receiving station with the proper phasing shown in FIG. 1, I insert between rectifiers $12_1$, $12_2$ and oscillator 11 a delay network 52 with a delay interval $d$ and apply the output of the oscillator directly to a modulator 32 which also receives the frequency $F_a$ from an oscillator 33. A high-pass filter 34 sifts the frequency $F_b$ from the output of modulator 32 and applies it to the transmitter 29 which also is supplied with the frequency $F_a$ directly from oscilaltor 33. It will be apparent that the constant-frequency outputs of oscillator 33 and filter 34 will not materially add to the overall bandwidth requirements of the system.

Figures 3, 4:
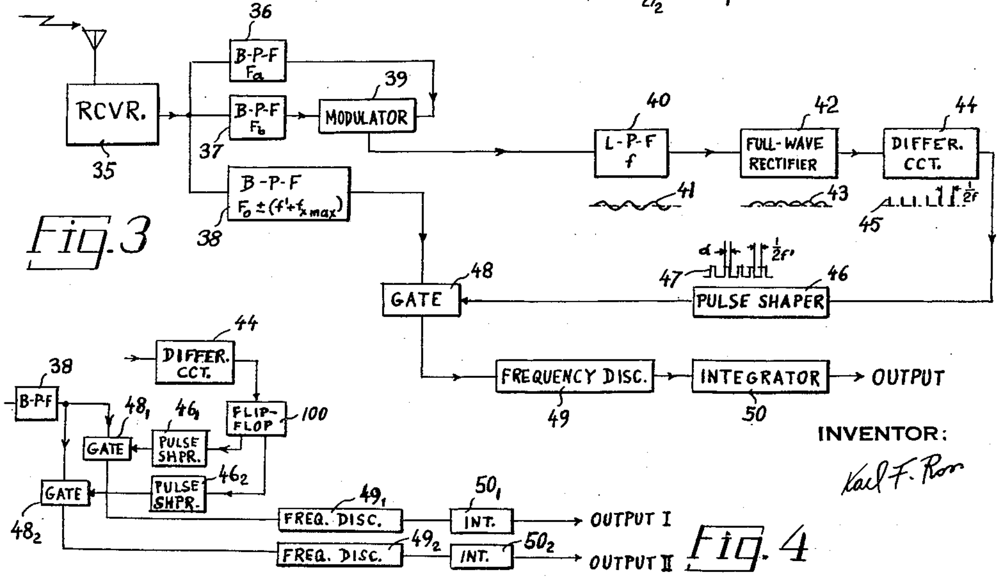
FIG. 3 is a circuit arrangement of a receiving station associated with the transmitting station of FIG. 2.
FIG. 4 is a circuit diagram showing a modification of part of the receiving system of FIG. 3.

Reference is now made to FIG. 3 for a description of a receiving station adapted to demodulate the carrier waves $W_1$, $W_2$ of FIG. 1. It comprises a receiver 35 whose output is separated by three band-pass filters 36, 37, 38 into the frequency components $F_a$, $F_b$ and $F \pm f'$, the pass band filter 38 being wide enough to allow for a maximum excursion $f_{x\ max}$ of carrier frequency F from the mean $F_0$. A modulator 39, connected across the outputs of filters 36 and 37, works into a low-pass filter 40 which selects the frequency $f$, thereby producing a since wave 41 in step with reference wave W. A full-wave rectifier 42 produces the pulsating voltage 43 which is converted by a differentiation circuit 44 into a train of sharp pulses 45. A pulse shaper 46 transforms these latter pulses, whose spacing is $\frac{1}{2}f$, into rectangular pulses 47 of width $d$ and spacing $\frac{1}{2}f'$. The pulses 47 serve periodically to unblock a gate 48 through which the output of filter 38 is allowed to pass to a frequency discriminator 49, the latter thus operating only on the plateau portions P of the received wave. Frequency discriminator 49 works into an integrating circuit 50 which produces an output essentially corresponding to the signal of source 21 in FIG. 2.

The source of input signal 21 of FIG. 2, instead of delivering the same message wave to the gates $22_1$ and $22_2$ for alternate sampling thereby, may also transmit to these gates two separate message waves to be converted into the signal pulses $27_1$ and $27_2$, respectively. In such case the receiving circuit of FIG. 3 may be modified to separate the two signals, as shown in FIG. 4. Thus, the output of differentiation circuit 44 may now be fed to a flip-flop circuit 100 whose output is converted by two pulse shapers $46_1$, $46_2$ into trains of pulses 47 (FIG. 3) delivered alternately to the gates $48_1$, $48_2$ which are connected in parallel to band-pass filter 38. The alternate unblocking of gates $48_1$ and $48_2$ by these pulses for brief intervals $d$, separated in the case of each gate by an interval $\frac{1}{2}f + \frac{1}{2}f'$, results in the delivery of alternate bursts of carrier wave to two frequency discriminators $49_1$, $49_2$ which work into respective integrators $50_1$ and $50_2$ to produce two separate outputs, labeled I and II, corresponding to the two original signals.

Figures 5, 6, 7, 8:
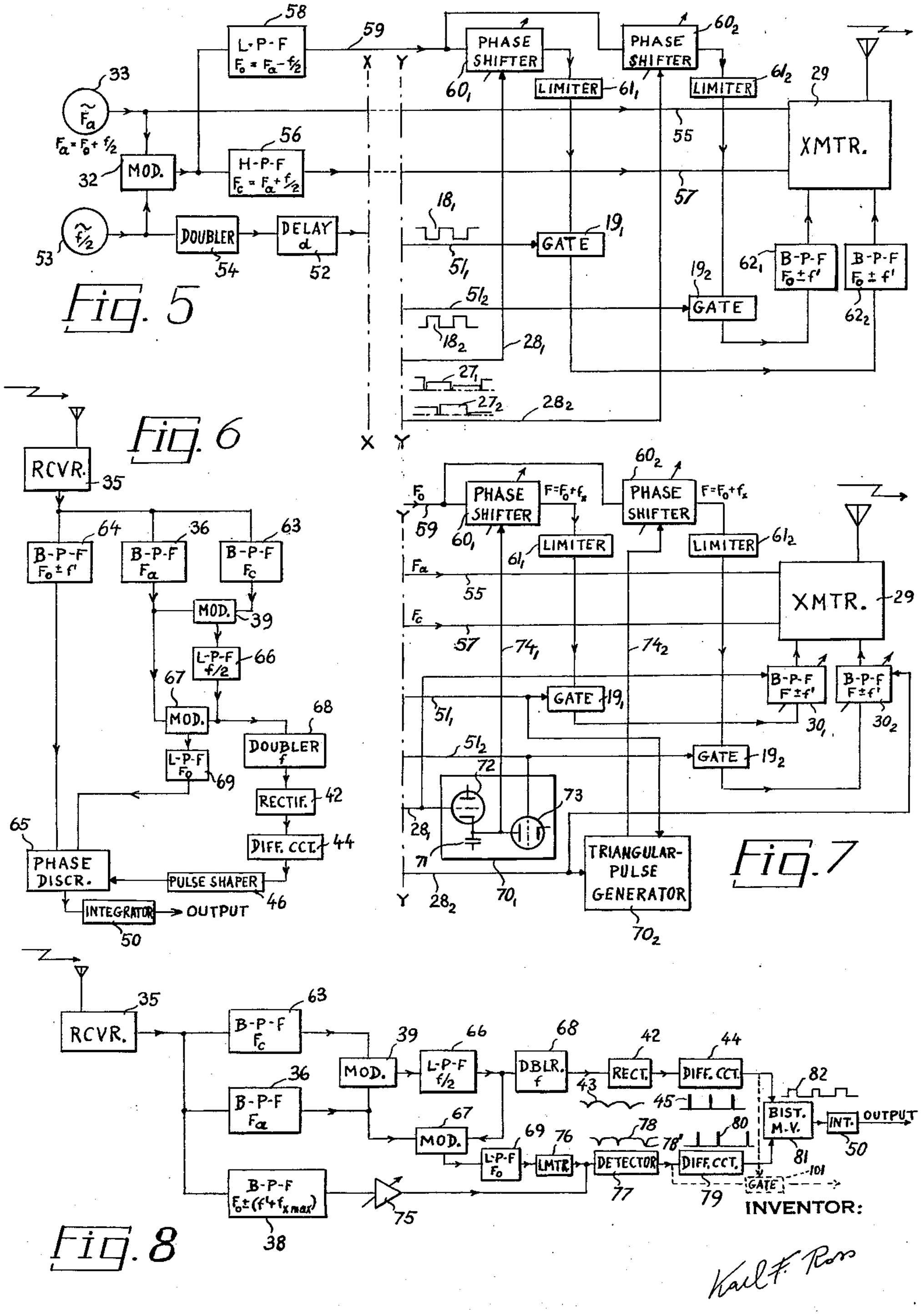
FIG. 5 is a circuit diagram showing certain modifications of that part of the transmitting station which is located outside lines X—X and Y—Y of FIG. 2.
FIG. 6 is a circuit diagram of a receiving station associated with the transmitting station of FIG. 5.
FIG. 7 shows a further modification of the transmitter diagram to the right of line Y—Y.
FIG. 8 is a circuit diagram of a receiving station associated with the transmitting station of FIG. 7.

Signal transmission by a system according to the invention may also be accomplished if the phase, rather than the frequency, of the carrier waves $W_1$, $W_2$ is shifted during the zero-amplitude intervals S. A circuit for performing this operation is shown in FIG. 5 which includes, between lines X—X and Y—Y, the various circuit elements shown between the similarly designated lines of FIG. 2. The system of FIG. 5 also includes the transmitter 29, the gate circuits $19_1$, $19_2$ and the delay network 52, the latter receiving the frequency $f$ from an oscillator 53 of operating frequency $f/2$ via a frequency doubler 54. The steady reference frequency $F_a$, produced by oscillator 33, has been selected in this embodiment to equal the sum of the frequencies $F_0$ and $f/2$. Oscillator 33 supplies this frequency, via a lead 55, to the transmitter 29 and also applies it to one input of modulator 32 which receives the frequency $f/2$ from oscillator 53. A high-pass filter 56 selects from the output of modulator 32 the sum frequency $F_c = F_a + f/2$ and delivers it, via a lead 57, to the transmitter 29; at the same time, a low-pass filter 58 sifts from the modulator output the mean carrier frequency $F_0$. The output lead 59 of filter 58 is connected in parallel to two phase shifters $60_1$, $60_2$, which work into the gate circuits $19_1$, $19_2$ via limiters $61_1$, $61_2$ serving to remove all incidental amplitude fluctuations from the outputs of these phase shifters. From the gate circuits $19_1$, $19_2$ the phase-modulated carrier waves of frequency $F_0$ reach the transmitter 29 by way of respective band-pass filters $62_1$, $62_2$ which need not be adjustable since the carrier frequency remains fixed.

The operation of the system of FIG. 5 is analogous to that of FIG. 2 in that the phase shifters $60_1$, $60_2$ are controlled by the signal pulses $27_1$, $27_2$ transmitted over leads $28_1$, $28_2$ whereas the gates $19_1$, $19_2$ are periodically unblocked by the multivibrator pulses $18_1$, $18_2$ on leads $51_1$, $52_2$. Thus, bursts of phase-modulated carrier $F_0$ are radiated by the transmitter 29 in the rhythm of the pulses $18_1$, $18_2$ but with a partly linear, partly sinusoidal envelope as illustrated in FIG. 1.

The receiving circuit of FIG. 6 is adapted to demodulate the phase-modulated carrier waves from the transmitter of FIG. 5. The receiver proper, again designated 35, works into the three band-pass filters 36, 63 and 64. Filter 63 selects from the receiver output the reference wave of frequency $F_c$; filter 64 is similar to the filter 38 of FIG. 3 but may have its pass band strictly limited to the range $F_0 \pm f'$. The output of this filter is delivered to a phase discriminator 65 of conventional design. The filters 36 and 63 work into modulator 39 from whose output the frequency $f/2$ is selected by low-pass filter 66. The latter frequency is delivered to a modulator 67, along with the frequency $F_a$, and also to a frequency doubler 68.

The output of modulator 67, selected by a low-pass filter 69, is a reference wave of constant frequency $F_0$ (or of some frequency harmonically related thereto) and constant phase which is applied to the discriminator 65 for comparison with the phase-modulated output of band-pass filter 64. The phase discriminator 65 is periodically enabled by pulses 47 (see FIG. 3) derived from the output of frequency doubler 68 by means of rectifier 42, differentiation circuit 44 and pulse shaper 46. Integrator 50 converts the intermittent output of discriminator 65 into a replica of the original signal.

The circuit of FIG. 7 is similar to that of FIG. 5 and includes many of the elements of the latter, the chief difference being that in FIG. 7 the phase of the reference wave of frequency $F_0$ is varied not abruptly but gradually, at a rate determined by the amplitude of the current signal sample, to produce two waves of frequency $F = F_0 + f_x$ dependent upon signal amplitude. This is true because the frequency of a wave varies with time as the differential quotient of phase, hence a progressive phase shift is tantamount to a constant frequency increment. The use of the circuitous way of phase modulation in lieu of direct frequency modulation has the advantage of insuring coincidence of the modulated waves with the unmodulated reference wave of frequency $F_0$ at the beginning of the modulating interval, i.e. at the time when the gate $\mathbf{19}_1$ or $\mathbf{19}_2$ is unblocked by a respective pulse over lead $\mathbf{51}_1$ or $\mathbf{51}_2$. The phase shift is brought about by two triangular-pulse generators $\mathbf{70}_1$, $\mathbf{70}_2$ controlling the phase shifters $\mathbf{60}_1$ and $\mathbf{60}_2$, respectively, in response to the signal pulses transmitted to them via leads $\mathbf{28}_1$ and $\mathbf{28}_2$. As illustrated specifically for the pulse generator $\mathbf{70}_1$, they may each comprise a condenser 71 which is charged through a triode 72 at a rate determined by the amplitude of the signal pulse $\mathbf{27}_1$ or $\mathbf{27}_2$ (see FIG. 2) on the associated input lead and which is periodically discharged through a triode 73 when the latter is unblocked for half a period by the multivibrator pulse $\mathbf{18}_2$ on lead $\mathbf{51}_2$ or $\mathbf{18}_1$ on lead $\mathbf{51}_1$, respectively. The condenser potential is applied to a control electrode of the associated phase shifter $\mathbf{60}_1$ or $\mathbf{60}_2$ via a respective lead $\mathbf{74}_1$ or $\mathbf{74}_2$.

In FIG. 7 the band-pass filters $\mathbf{62}_1$ and $\mathbf{62}_2$ of FIG. 5 have again been replaced by the adjustable filters $\mathbf{30}_1$ and $\mathbf{30}_2$ of FIG. 2, in view of the variable character of the output frequency of phase shifters $\mathbf{60}_1$ and $\mathbf{60}_2$.

The frequency increment $f_x$ resulting from the progressive phase shift produced by the triangular-pulse generators $\mathbf{70}_1$ and $\mathbf{70}_2$ of FIG. 7 results in the occurrence of beats when the variable carrier frequency F is linearly superimposed upon the reference frequency $F_0$. These beats give rise to nodes at which the resulting oscillation is of zero or minimum amplitude, the spacing of successive nodes being determined by the magnitude of $f_x$. As long as the two frequencies F and $F_0$ are in a predetermined phase relationship at the beginning of a cycle, the time position of a subsequent node within the cycle will indicate the magnitude of the increment $f_x$ and, thereby, the value of an instantaneous signal amplitude to be transmitted. Thus, I have shown in FIG. 8 a receiving circuit suitable for demodulating the message transmitted by the system of FIG. 7.

The circuit of FIG. 8 contains many of the elements of FIG. 6 but the filter 64, connected in parallel with filters 36 and 63 to the output of receiver 35, has been replaced by the filter 38 of FIG. 3 whose pass band is $F_0 \pm (f' + f_{x\ max})$. The modulated carrier frequency F from filter 38 is passed through an adjustable amplifier 75 which maintains the value of its output amplitude at substantially the amplitude level of reference frequency $F_0$ as derived from low-pass filter 69 via a limiter 76. The two frequencies are then linearly added in a detector 77 which derives from the resulting beat oscillation an epicycloid envelope 78 having variously spaced nodal points 78'. A differentiation circuit 79 derives from the wave 78 a train of spaced pulses 80 coinciding with the nodes 78'. A bistable multivibrator 81, controlled alternately by the time-modulated pulses 80 and by the uniformly spaced pulses 45 derived by differentiation circuit 44 from the rectified sine wave 43, produces a train of rectangular pulses 82 of varying width which is converted into the desired output signal by the integrator 50.

Figure 9:
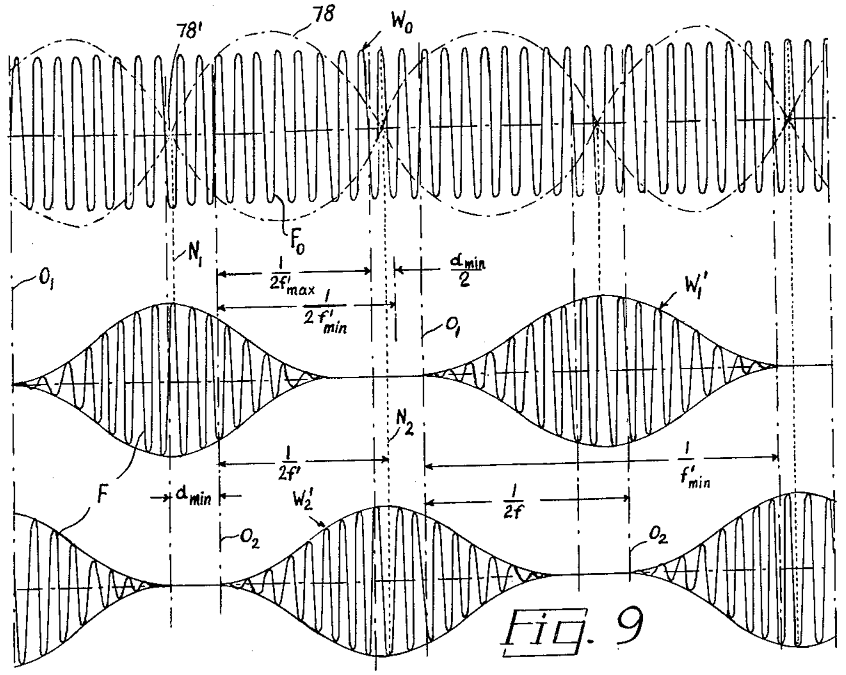
FIG. 9 is a set of graphs used to explain a further modification of the system of my invention.

The generation of a beat oscillation giving rise to the cycloidal envelope 78 will be better understood from FIG. 9 in which I have shown the phase relationship between reference wave $W_0$ (frequency $F_0$) and two modulated carrier waves $W_1'$ and $W_2'$ (frequency F) representative of the outputs of filters $\mathbf{30}_1$ and $\mathbf{30}_2$ in FIG. 7. In this figure the bursts of carrier frequency occurring over the variable modulating interval $1/f'$ have been shown with a sinusoidal envelope although it is to be understood that as produced by the system of FIG. 7 they will also generally have a plateau P as illustrated in FIG. 1. The presence or absence of such plateau modifies the shape of the resulting cycloid 78 but is otherwise immaterial for the operation of the receiving station of FIG. 8.

At an instant designated $O_1$ for carrier $W_1'$ and $O_2$ for carrier $W_2'$, representing the beginning of the leading edge of a respective carrier envelope, the carrier is in phase with reference wave $W_0$. In FIG. 9 the relationship between the modulating frequency $f'$ and the difference frequency $f_x$ has been so chosen that after an interval $\frac{1}{2}f'$ the carrier and the reference wave are 180° out of phase, this occurring at an instant $N_1$ for carrier $W_1'$ and $N_2$ for carrier $W_2'$. At such instant the envelope 78 of the combined wave $W_0$, $W_1'$, $W_2'$ goes through a node 78'. Thus, the node will occur at the peak of the respective carrier wave, as a result of the aforementioned relationship according to which $f_x = kf'$ where $k$ is a positive integer (not necessarily the same for the two carriers $W_1'$ and $W_2'$). In the more general case of a system as shown in FIG. 7, where the modulating frequency $f'$ has a fixed value greater than $f$, it is merely required that the node coincide with the corresponding plateau P, thus that $f \leq f_x/k \leq f'$. In either case it will be necessary that a node in one carrier coincide with a zero-amplitude interval of the other carrier.

In order to satisfy the last-mentioned requirement with the frequency relationship described in connection with FIG. 9, the occurrence of a node must be limited to an interval corresponding to half the minimum spacing $d_{min} = 1/f - 1/f'_{min} = \frac{1}{2}f - \frac{1}{2}f'_{max}$ between the trailing edge of one carrier pulse and the leading edge of the next, whence $$1/f'_{min} - \tfrac{1}{2}f'_{max} = \tfrac{1}{2}f \text{ or } k/f_{x\ min} - k/2f_{x\ max} = \tfrac{1}{2}f$$

Although $k$ could be any positive integer, it will be desirable to keep its value low (preferably at unity) in order to prevent the occurrence of more than one node within any demodulation interval $d$ and to minimize the bandwidth requirement. Thus, in a preferred instance $f_x = f'$; a system for automatically maintaining this relationship will be described in connection with FIGS. 10 and 11.

The system of FIG. 7 may also be operated with $f' = f$ (the periods P and S being reduced to zero) and with $kf_x$ so close to $f$ that the output of detector 77 (FIG. 8) will vary, at successive instances determined by the occurrence of pulses 45, about a point on one of the steep flanks of envelope 78 on either side of node 78'. In this case, with $kf_x$ selected to be consistently larger (or smaller) than $f$, the original signal may be reconstituted from the pulses of varying amplitude produced by a sampling of wave envelope 78 in a gate circuit 101 periodically unblocked by the pulses 45, as illustrated in dotted lines in FIG. 8.

Figures 10, 11:
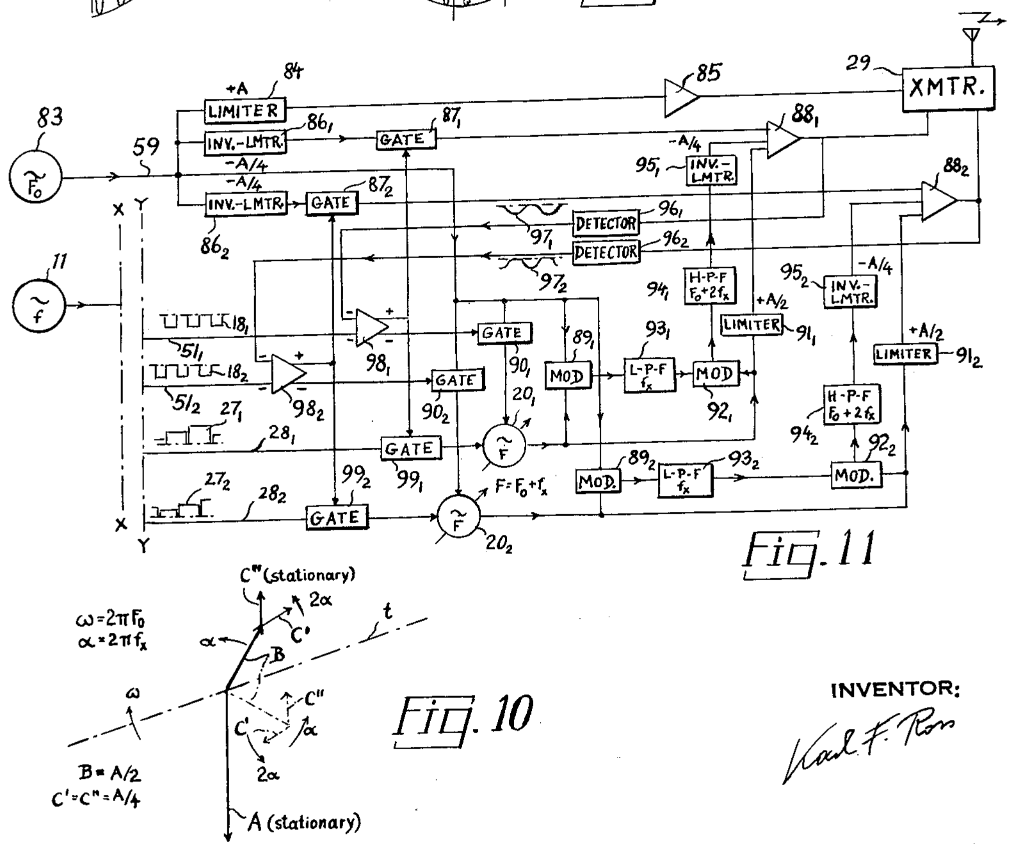
FIG. 10 is a vector diagram illustrating the mode of operation of this modified system.
FIG. 11 is a circuit diagram of a transmittting station similar to that of FIG. 2 but with the portions outside lines X—X and Y—Y further modified to operate in accordance with the principles illustrated by FIGS. 9 and 10.

In the vector diagram of FIG. 10 the time axis $t$ is shown to rotate at an angular velocity $\omega=2\pi F_0$ past a stationary vector A representing the constant amplitude of reference wave $W_0$. In this diagram the carrier frequency $F=F_0+f_x$, representing either of the oscillations $W_1'$ and $W_2'$ in FIG. 9, is shown as composed of three vectors B, C′, C″ of which the first has a magnitude of one-half and the other two have each a magnitude of one-fourth that of vector A. The composite vector B, C′, C″ represents a carrier and two sidebands so related to one another that this vector goes through zero when in phase with vector A and reaches its maximum when in counterphase thereto, being then of the same magnitude as vector A. With vector B rotating relatively to vector A at an angular velocity $\alpha=2\pi f_x$, vector C′ leads and vector C″ lags vector B by a like angular velocity so that the realtive speed of vector C′ is $2\alpha$ while vector C″ is stationary. It will thus be seen that the sinusoidal envelope of carrier $W_1'$ or $W_2'$ in FIG. 9 can be brought about by linearly combining an oscillation $(A/2)\cos(\omega+\alpha)t$ with two sidebands $(A/4)\cos(\omega+2\alpha)t$ and $(A/4)\cos\omega t$ and that, if the resulting modulated carrier is linearly combined with a refernce oscillation $A\cos\omega t$, a cycloidal envelope similar to that shown at 78 will be obtained. (If the carrier envelope includes a plateau P as shown in FIG. 1, then the shape of envelope 78 will be modified and its flanks around nodes 78′ will not be as steep as in FIG. 9.

FIG. 11 shows a transmitting circuit adapted to synthesize the carriers $W_1'$ and $W_2'$ of FIG. 9 by the method described in connection with FIG. 10. Reference frequency $F_0$, produced by an oscillator 83, is supplied to transmitter 29 via lead 59 by way of a limiter 84, which maintains the amplitude of this oscillation at a predetermined constant value A, and an amplifier 85. From lead 59 this frequency also passes through a first inverter-limiter $86_1$ and a gate $87_1$ to an amplifier $88_1$ and through a second inverter-limiter $86_2$ and a gate $87_2$ to an amplifier $88_2$. Each inverter-limiter establishes the amplitude of the oscillation $W_0$ and $-A/4$, the minus sign indicating a phase opposite to that of the oscillation passing through limiter 84.

Lead 59 also applies the reference frequency $F_0$ to two modulators $89_1$, $89_2$ and, via respective gates $90_1$, $90_2$, to the two variable oscillators $20_1$ and $20_2$ which are thus blocked in step with oscilaltor 83 when the associated gate $90_1$ or $90_2$ is unblocked in the manner described hereinafter. The output $F=F_0+f_x$ of each oscillator $20_1$, $20_2$ is applied, respectively, to modulator $89_1$, $89_2$ and in parallel therewith to amplifier $88_1$, $88_2$ via a limiter $91_1$, $91_2$, the latter establishing the output of frequency F at a value $+A/2$; this output is also fed to a second modulator $92_1$, $92_2$ which receives the difference frequency $f_x$ from modulator $89_1$, $89_2$ through a low-pass filter $93_1$, $93_2$, respectively. From the output of modulators $92_1$, $92_2$ a respective high-pass filter $94_1$, $94_2$ selects the frequency $F_0+2f_x$ which is supplied to amplifier $88_1$, $88_2$ via an inverter-limiter $95_1$, $95_2$, respectively, with an amplitude $-A/4$. It will now be seen that each amplifier 88 receives from limiters 91, 95 and 86 three frequencies respectively corresponding to the vectors B, C′ and C″ in FIG. 10; the three amplifiers 85, $88_1$ and $88_2$ should have the same gain so as to leave unaltered the relative amplitudes of the oscillations passed by these limiters and by the limiter 84.

The circuit of FIG. 11 also includes two detectors $96_1$, $96_2$ which derive from the output of amplifiers $88_1$, $88_2$ the sinusoidal envelopes of carriers W′, W″, respectively, and apply them as negative pulses $97_1$, $97_2$ to one of the inputs of respective control amplifiers $98_1$, $98_2$.

To the other inputs of these amplifiers are applied, again in the form of negative voltages, the multivibrator pulses $18_1$, $18_2$ arriving over leads $51_1$, $51_2$, respectively.

The signal pulses $27_1$, $27_2$ on leads $28_1$, $28_2$ control the oscillators $20_1$, $20_2$ through gates $99_1$, $99_2$, respectively. Amplifier $98_1$ has a first output lead over which it applies an unblocking voltage (+) through gates $87_1$ and $99_1$ whenever either of its inputs is driven negative; under the same conditions a blocking voltage (−) is applied by it over a second output lead to gate $90_1$. In analogous manner the gates $87_2$, $99_2$ and $90_2$ are controlled from amplifier $98_2$. Thus, the instant $O_1$ (FIG. 8) coincides with the leading edge of a negative pulse $18_1$ which opens the gate $87_1$ or $99_1$ and closes the gate $90_1$, this condition being maintained even after the cessation of pulse $18_1$ until the negative voltage $97_1$ in the output of detector $96_1$ has disappeared. Similarly, the instant $O_2$ coincides with the leading edge of a pulse $18_2$.

It will be apparent that a receiving station as shown in FIG. 8 will be capable of demodulating the composite carrier emitted by the transmitting station of FIG. 11 and of reproducing the message wave represented by the pulses $27_1$ and $27_2$.

The method described with reference to FIG. 10, using three vector (A—C″), B and C′ of magnitude ratio 3:2:1, has general utility in any system in which it is desired to express the duration of a time interval in terms of frequency or angular velocity. Thus, such time interval may be measured between two nodes 78′, or between one node and a reference time such as the instants $O_1$ or $O_2$, the length of the interval being determined in either case by the difference frequency $f_x$ representing the speed with which vector B rotates relatively to vector (A−C″). This method may also be practiced by means other than those shown in FIG. 11, e.g. graphically or through indirect transmission of the difference frequency $f_x$.

Within the framework of the invention, as will be readily understood, more than two modulated carrier waves may be interleaved in the manner illustrated in FIG. 1 or 9 (with suitable lengthening of the inter-pulse spaces S) and these several waves may be used for the transmission of the same or different messages as described in connection with FIGS. 3 and 4.

Other modifications of the system herein disclosed will be readily apparent to persons skilled in the art and are intended to be encompassed in the scope of the invention as defined in the appended claims.

I claim:

1. A system for transmitting intelligence, comprising an adjustable source of carrier wave, blocking means for periodically suppressing said carrier wave in the rhythm of a control frequency, control means for said source responsive to an input signal, circuit means synchronized with said blocking means for intermittently rendering said control means effective to angle-modulate the output of said source during periods in which said carrier wave is suppressed while maintaining the frequency of the so modulated output substantially constant at all other times, and transmitter means connected to said source for sending out said carrier wave, and bandwidth-limiting means between said source and said transmitter means for substantially eliminating harmonics of said control frequency in the sidebands of said carrier wave during intervals of transition from suppressed to unsuppressed condition and vice versa.

2. A system according to claim 1 wherein said bandwidth-limiting means comprises adjustable band-filter means, said control means being connected to said band-filter means to vary the pass band thereof in accordance with the operating frequency of said source.

3. A system for transmitting intelligence, comprising a first and a second adjustable source of carrier wave, first and second blocking means for periodically suppressing the carrier wave from alternately said first and said second source, control means for said sources responsive to an input signal representing at least one message wave, circuit means synchronized with said blocking means for intermittently rendering said control means effective to angle-modulate the output of each of said sources during periods in which the respective carrier wave is suppressed while maintaining the frequency of the so modulated output substantially constant at all other times, and transmitter means connected to both of said sources for sending out the combined carrier waves thereof; said control means comprising message-wave-sampling means adapted to produce a succession of message pulses; said circuit means including timer means for triggering said message-wave-sampling means twice during a sampling interval of predetermined duration, distributor means controlled by said timer means for directing said message pulses alternately to said first and said second source, and a generator of gating pulses responsive to said timer means for respectively disabling said first and said second blocking means during alternate halves of said sampling interval.

4. A system according to claim 4 wherein said distributor means comprises pulse-storage means for converting each of said message pulses into a signal pulse of constant amplitude and duration substantially equal to half of said sampling interval and for applying said signal pulse to the respective carrier-wave source.

5. A system for transmitting intelligence, comprising a source of carrier wave having a relatively high operating frequency F, timer means having an output varying periodically at a relatively low control frequency $f$ defining a succession of fixed intervals $1/f$, amplitude-modulating means connected to said source for converting said carrier wave into a succession of carrier pulses having substantially sinusoidal leading and trailing edges with a period of the order of said intervals $1/f$, said carrier wave being substantially completely suppressed between said carrier pulses, control means connected to be actuated by said timer means for angle-modulating the output of said source between said carrier pulses in response to instantaneous values of a message signal to be transmitted, and transmitter means for sending out said carrier pulses, said source comprising a generator of fixed reference frequency $F_0$, said control means and said amplitude-modulating means together comprising modulator means for producing a carrier frequency $F_0+f_x$, having substantially half the amplitude of said reference frequency $F_0$, and two sidebands $F_0$ and $F_0+2f_x$, each having substantially one-fourth the amplitude of said reference frequency, and means for combining all of said frequencies, $f_x$ being a frequency increment of either sign which is constant throughout any of said intervals $1/f$.

6. In a communication system, in combination, a source of carrier wave having a relatively high constant operating frequency F, timer means having an output varying periodically at a relatively low control frequency $f$ defining a succession of fixed intervals $1/f$, amplitude-modulating means connected to said source for converting said carrier wave into a succession of carrier pulses having substantially sinusoidal leading and trailing edges with a period of the order of said intervals $1/f$, said carrier wave being substantially completely suppressed between said carrier pulses, control means connected to be actuated by said timer means for angle-modulating the output of said source between said carrier pulses, in response to instantaneous values of a message signal to be transmitted, while maintaining the frequency of the so modulated output substantially constant for the duration of each carrier pulse, transmitter means for sending out said carrier pulses and a continuous reference wave of constant frequency related to said control frequency $f$ and to said operating frequency F, receiver means for receiving both said reference wave and said carrier pulses, circuit means for reconstituting said intervals $1/f$ from the received reference wave, and output means controlled by said circuit means for periodically sampling the received carrier pulses at predetermined instants of said intervals $1/f$, said control means comprising means for shifting the phase of said carrier wave, said output means including a phase discriminator.

7. In a communication system, in combination, a source of carrier wave having a relatively high operating frequency F, timer means having an output varying periodically at a relatively low control frequency $f$ defining a succession of fixed intervals $1/f$, amplitude-modulating means connected to said source for converting said carrier wave into a succession of carrier pulses having substantially sinusoidal leading and trailing edges with a period of the order of said intervals $1/f$, said carrier wave being substantially completely suppressed between said carrier pulses, control means connected to be actuated by said timer means for angle-modulating the output of said source between said carrier pulses, in response to instantaneous values of a message signal to be transmitted, while maintaining the frequency of the so modulated output substantially constant for the duration of each carrier pulse, transmitter means for sending out said carrier pulses and a continuous reference wave of constant frequency related to said control frequency $f$, receiver means for receiving both said reference wave and said carrier pulses, circuit means for reconstituting said intervals $1/f$ from the received reference wave, and output means controlled by said circuit means for periodically sampling the received carrier pulses at predetermined instants of said intervals $1/f$, said control means comprising modulator means for altering the value of said operating frequency F about a mean value $F_0$, said output means including demodulator means for deriving from said carrier pulses combined with said reference wave a succession of pulses representative of said message signal.

8. The combination according to claim 7 wherein the operating frequency of said source is stabilized at said value $F_0$, said modulator means comprising means for progressively shifting the phase of said operating frequency by substantially constant increments over at least a portion of an interval $1/f$, said demodulator means including a detector and means for linearly combining said carrier pulses and said reference wave in the input of said detector.

9. In a communication system, in combination, a source of carrier wave having a relatively high operating frequency F, timer means having an output varying periodically at a relatively low control frequency $f$ defining a succession of fixed intervals $1/f$, amplitude-modulating means connected to said source for converting said carrier wave into a succession of carrier pulses having substantially sinusoidal leading and trailing edges with a period of the order of said intervals $1/f$, said carrier wave being substantially completely suppressed between said carrier pulses, control means connected to be actuated by said timer means for angle-modulating the output of said source between said carrier pulses, in response to instantaneous values of a message signal to be transmitted, while maintaining the frequency of the so modulated output substantially constant for the duration of each carrier pulse, transmitter means for sending out said carrier pulses and a continuous reference wave of constant frequency related to said control frequency $f$, receiver means for receiving both said reference wave and said carrier pulses, circuit means for reconstituting said intervals $1/f$ from the received reference wave, and output means controlled by said circuit means for periodically sampling the received carrier pulses at predetermined instants of said intervals $1/f$, said control means comprising modulator means for altering the value of said operating frequency, said output means including a frequency discriminator.

10. In a communication system, in combination, a first and a second source of carrier wave having a relatively high operating frequency F, timer means having an output varying periodically at a relatively low control frequency $f$ defining a succession of fixed intervals $1/f$, amplitude-modulating means connected to said sources for converting the carrier waves produced thereby into two trains of carrier pulses each having substantially sinusoidal leading and trailing edges with a period of the order of said intervals $1/f$, each carrier wave being substantially completely suppressed between the carrier pulses of the respective train, the leading edges of one train substantially coinciding with the trailing edges of the other train and vice versa, control means connected to be actuated by said timer means for angle-modulating the output of each of said sources in the suppressed condition of its carrier wave in response to instantaneous message-signal values to be transmitted, transmitter means for sending out both of said trains of carrier pulses and a reference wave related to said control frequency $f$, receiver means for receiving both said reference wave and said trains of carrier pulses, circuit means for reconstituting said intervals $1/f$ from the received reference wave, and output means controlled by said circuit means for periodically sampling each train of carrier pulses at predetermined instants of said intervals $1/f$ at which the carrier wave of the other train is suppressed.

11. The combination according to claim 10 wherein said amplitude-modulating means includes band-filter means connected between said sources and said transmitter means, said band-filter means having a pass band substantially limited to a frequency range $F \pm f'$, $f'$ being a sideband frequency of the order of said control frequency $f$ but lower than the latter, said amplitude-modulating means being adapted to maintain the amplitude of each carrier pulse at a substantially constant plateau value over a period approximately given with $\frac{1}{2}f - \frac{1}{2}f'$ following its leading edge and to keep said amplitude substantially at zero for a like period following its trailing edge.

12. A system for measuring a time interval, comprising means for producing a first, a second and a third sinusoidal wave of constant frequency and amplitude respectively representable by a first vector rotating at a higher speed relatively to a time axis, a second vector rotating at a lower speed relatively to said first vector, and a third vector rotating at twice said lower speed relatively to said first vector, said first, second and third vectors having magnitudes substantially in the ratio of 3:2:1, and means for linearly combining said sinusoidal waves into a resulting oscillation of cycloidal amplitude, said lower speed being so chosen in relation to a time interval to be measured that the resulting oscillation has a node marking at least one of the limits of said time interval.

13. A system for transmitting a succession of discrete values represented by a train of message pulses, comprising an adustable source of carrier wave, blocking means for periodically suppressing said carrier wave in the rhythm of said message pulses, control means responsive to said message pulses, circuit means for intermittently rendering said control means effective to angle-modulate the output of said source, during periods of suppression of said carrier wave, to an extent determined by the magnitude of the respective message pulse, said circuit means being synchronized with said blocking means for maintaining the frequency of said source substantially constant during periods of inoperativeness of said blocking means, transmitter means connected to said source for sending out the resulting carrier-wave pulses of different but constant frequency, and bandwidth limiting means between said source and said transmitter means for substantially eliminating harmonics of the recurrence frequency of said message pulses in the sidebands of said carrier wave during intervals of transition from suppressed to unsuppressed condition and vice versa.

References Cited in the file of this patent

UNITED STATES PATENTS

| | | |
|---|---|---|
| 2,113,214 | Luck | Apr. 5, 1938 |
| 2,323,598 | Hathaway | July 6, 1943 |
| 2,531,433 | Hoffman et al. | Nov. 28, 1950 |
| 2,758,202 | Wilmotte | Aug. 7, 1956 |
| 2,845,613 | Pawley | July 28, 1958 |